(12) United States Patent
Marsten et al.

(10) Patent No.: US 9,171,046 B1
(45) Date of Patent: Oct. 27, 2015

(54) SYSTEM AND METHOD FOR GENERATING AN OUTPUT OF RELEVANT QUERIES FOR A DATABASE

(71) Applicants: Roy Marsten, Atlanta, GA (US);
Russell Caldwell, Atlanta, GA (US);
Radhika Subramanian, Atlanta, GA (US)

(72) Inventors: Roy Marsten, Atlanta, GA (US);
Russell Caldwell, Atlanta, GA (US);
Radhika Subramanian, Atlanta, GA (US)

(73) Assignee: EMCIEN CORPORATION, Atlanta, GA (US)

( * ) Notice: Subject to any disclaimer, the term of this patent is extended or adjusted under 35 U.S.C. 154(b) by 221 days.

(21) Appl. No.: 14/027,071

(22) Filed: Sep. 13, 2013

Related U.S. Application Data

(60) Provisional application No. 61/833,017, filed on Jun. 10, 2013, provisional application No. 61/821,686, filed on May 9, 2013.

(51) Int. Cl.
 *G06F 17/30* (2006.01)
 *G06F 7/00* (2006.01)
 *G06Q 30/02* (2012.01)

(52) U.S. Cl.
 CPC ...... *G06F 17/3053* (2013.01); *G06F 17/30867* (2013.01); *G06F 17/30675* (2013.01); *G06F 17/30958* (2013.01); *G06Q 30/02* (2013.01)

(58) Field of Classification Search
 USPC .......................................................... 707/723
 See application file for complete search history.

(56) References Cited

U.S. PATENT DOCUMENTS

| | | | |
|---|---|---|---|
| 6,976,000 B1 | 12/2005 | Manganaris et al. | |
| 7,299,194 B1 | 11/2007 | Manganaris et al. | |
| 7,567,918 B2 | 7/2009 | Manganaris et al. | |
| 7,882,128 B2 | 2/2011 | Bollinger et al. | |
| 8,395,622 B2 * | 3/2013 | Modani ......................... | 345/440 |
| 2014/0156633 A1 * | 6/2014 | Duan et al. .................... | 707/713 |
| 2014/0214936 A1 * | 7/2014 | Abraham et al. ............. | 709/204 |

OTHER PUBLICATIONS

Talukdar et al.: "Learning to Create Data Integrating Queries", PVLDB '08, Aug. 23-28, 2008, Auckland, New Zealand.*
Pang-Ning Tan et al, "Introduction to Data Mining," Publisher: Pearson Addison Wesley, 2006, chapters 6-7, pp. 327-486.

* cited by examiner

*Primary Examiner* — Kuen Lu
(74) *Attorney, Agent, or Firm* — Smith Risley Tempel Santos LLC; Steven P. Wigmore

(57) ABSTRACT

Relevant queries of a database may be determined by: receiving data from a table in a database and reviewing the data and forming a K=2 graph. A K=2 graph is one which identifies relationships between two items in rows of the table in the database. If two items occur in the a same row in a database, then these two items are considered to have a relationship represented by an arc between each node which represents each data item or point. Each arc may be assigned a weight equal to the number of rows in which the two items appear together. Next, the K=2 graph may be compacted. Subsequently, cliques of up to a predetermined number, like seven nodes from the K=2 graph may be identified. For each clique that is identified, it may be determined if the clique meets a super clique threshold. The resultant super cliques are ranked.

19 Claims, 9 Drawing Sheets

100A

|  | COLOR | ● | ● | ● | STYLE |
|---|---|---|---|---|---|
| CAR 1 | ● | ● | ● | ● | ● |
| CAR 2 | ● | ● | ● | ● | ● |
| ● | ● | ● | ● | ● | ● |
| ● | ● | ● | ● | ● | ● |
| ● | ● | ● | ● | ● | ● |
| ● | ● | ● | ● | ● | ● |
| ● | ● | ● | ● | ● | ● |

| ● | ● | ● | ● | ● | ● |
|---|---|---|---|---|---|
| HAPPY | BIRTHDAY | ● | ● | | |
| HOW | ARE | ● | ● | ● | |

FIG. 1B

100C    104 Doctor's comments

102

| Height | Weight | Blood Press. |
|---|---|---|
| ● | ● | ● |
| ● | ● | ● |
| ● | ● | ● |

| Patient was crying. | Shot was given. |
|---|---|
| Patient was healthy. | |

FIG. 1C

SYSTEM AND METHOD FOR GENERATING AN OUTPUT OF RELEVANT QUERIES FOR A DATABASE

DESCRIPTION OF THE RELATED ART

In a database query, usually the contents of a query "asks" the database what rows of a table satisfy a particular condition or set of parameters. Many queries which are asked of a database may never have an answer meaning that there are no rows of a table which satisfy the condition or set of parameters.

Usually a human having intuition guesses relationships or identifies a set of parameters which may exist within tables of the database. In other words, the human may observe trends in data and may ask queries based on intuition which may also help the human identify more trends that exist in a database.

This activity may be characterized as hypothesis generation in which trained professionals, such as scientists, review data and try to determine trends and relationships among parameters within the data contained within a database. Each hypothesis is then later tested to determine if the hypothesis was correct.

Some attempts have been made in the past to automate the generation of queries for a database. However, the automation of such query generation is highly inefficient. Some automated query generation develops queries at random in order to guess or identify potential trends within a database. Other methods systematically go through data to every potential query that may be possible among the data within a database. Such a systematic approach which requires the asking of every potential query is too voluminous even for the most powerful computers available as of this writing.

SUMMARY OF THE DISCLOSURE

A method and system for generating output of relevant queries for a database includes receiving data from a table in a database and reviewing the data and forming a K=2 graph. A graph may have nodes (represented by shapes like circles) and arcs (represented by shapes such as lines) where an arc may connect two nodes. A K=2 graph is one which identifies relationships between two items in rows of the table in the database. If two items occur in the same row in a database, then these two items are considered to have a relationship represented by an arc between each node which represents each data item or point. Each arc may be assigned a weight equal to the number of rows in which the two items appear together.

Next, the K=2 graph may be compacted by applying a first threshold. Subsequently cliques of up to a predetermined number, such as, but not limited to, seven nodes from the K=2 graph may be identified. This predetermined number can be any number but is usually greater than the magnitude of five.

For each clique that is identified, it may be determined if the clique meets a super clique threshold. The resultant super cliques are ranked based on relevance or significance. Relevance or significance may comprise a measured value from mathematical formula.

The method and system may further include pruning a number of super cliques that were identified. And determining if a clique meets super clique threshold may include assigning each row of the table an index. A list of indices for each node of a respective clique may be formed that identifies which rows that a particular node may exist in the table.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral encompass all parts having the same reference numeral in all Figures.

FIG. 1A is a diagram of a first table of data stored in a database that may be used with the system and method for generating an output of relevant queries for the database;

FIG. 1B is a diagram of a second table of data stored in a database that may be used with the system and method for generating output of relevant queries for the database;

FIG. 1C is a diagram of a third table of data stored in a database that may be used with the system and method for generating output of relevant queries for the database;

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1D:
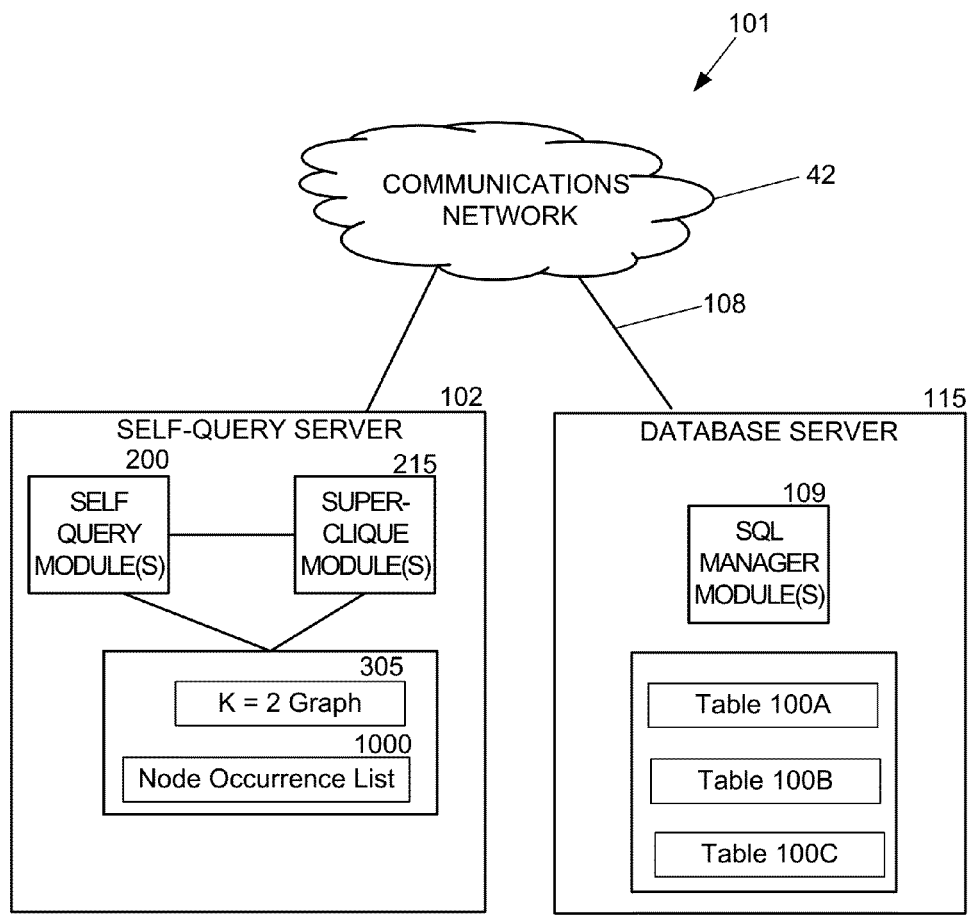
FIG. 1D is a diagram of one exemplary embodiment of the system for generating output of relevant queries for a database.

FIG. 1A is a diagram of table 100A of data from a database stored in a database server 115 (See FIG. 1D). The inventive system 101 (See FIG. 1D) and method 200 (See FIG. 2A) may process any types of data as illustrated in FIGS. 1A-1C. For example, product configuration data, such as options available for a line of automobiles from an automobile manufacturer, as illustrated in FIG. 1A. Other data may include shopping cart data that describes purchases made in typical grocery stores is one type of data which could benefit from the inventive system and method.

Another type of data may comprise short message streams such as TWITTER™ brand messages, such as illustrated in FIG. 1B described in further detail below. Other data may include firewall data logs for Web servers which track Internet sites being accessed by different users. Other data may also include medical data such as research data stored for medical studies like that of FIG. 1C described in further detail below.

A database is generally made up of a table 100 such as illustrated in FIGS. 1A-1C. Each table 100 usually has rows and columns of data. Some tables 100A such as illustrated in FIG. 1A may be characterized as "tidy" or neat in which such tables 100A have a fixed number of columns in a fixed number of rows. In this exemplary embodiment and for the remaining figures illustrated, solid black colored "dots" or circles represent data. So for the exemplary embodiment illustrated in FIG. 1A, the first column lists a "Car 1" and a "Car 2." One of ordinary skill in the art will appreciate that the remaining cells of the first column which have black dots/circles represent additional data like Car 3, Car 4, Car 5, etc. for this table 100A. The same holds true for the other cells of this table 100A and all other tables provided in this disclosure.

Meanwhile, other tables, like table 100B of FIG. 1B, may have only rows of data without any columns or column headers. Such a table 100B of FIG. 1B may be characterized as a "ragged" table relative to the table 100A. An example of a ragged table 100B as illustrated in FIG. 1B may be a table 100B that tracks short messaging streams like TWITTER™ data as understood by one of ordinary skill in the art.

Another type of table may be one that combines the tidy table 100A of FIG. 1A with the ragged table 100B of FIG. 1B in order to create a hybrid table 100C which has a fixed number of columns in one portion 102 in ragged entries in another portion 104. Such a hybrid table 100C of FIG. 1C could track medical patient data in which the "tidy" portion 102 tracks physiological measurements while the "ragged" portion 104 tracks written comments offered by medical personnel.

FIG. 1D is a diagram of one exemplary embodiment of the system 101 for generating output of relevant queries for a database 115. The system 101 may comprise a self query server 102 and a database server 115. The self query server 102 and the database server 115 may be coupled together via a communications network 42. The self query server 102 and the database server 115 may be coupled to the communications network 42 via communications links 108.

All elements of the system 100 may be coupled to the communications network 42. The elements are coupled to the communications network 42 via communications links 108A-E. The links 108 illustrated in FIG. 1A may be wired or wireless links. Wireless links include, but are not limited to, radio-frequency ("RF") links, infrared links, acoustic links, and other wireless mediums. The communications network 42 may comprise a wide area network ("WAN"), a local area network ("LAN"), the Internet, a Public Switched Telephony Network ("PSTN"), a paging network, or a combination thereof.

The self query server 102 may comprise one or more self query modules 200 and super clique modules 215. Further details of the one or more self query modules 200 will be described below in connection with FIG. 2A in which the one or more self query modules 200 correspond directly with steps of the flowchart 200 illustrated in FIG. 2A. That is, the method 200 illustrated in FIG. 2A may comprise software that is executed by the self query server 102 as understood by one of ordinary skill the art.

Figure 2A:
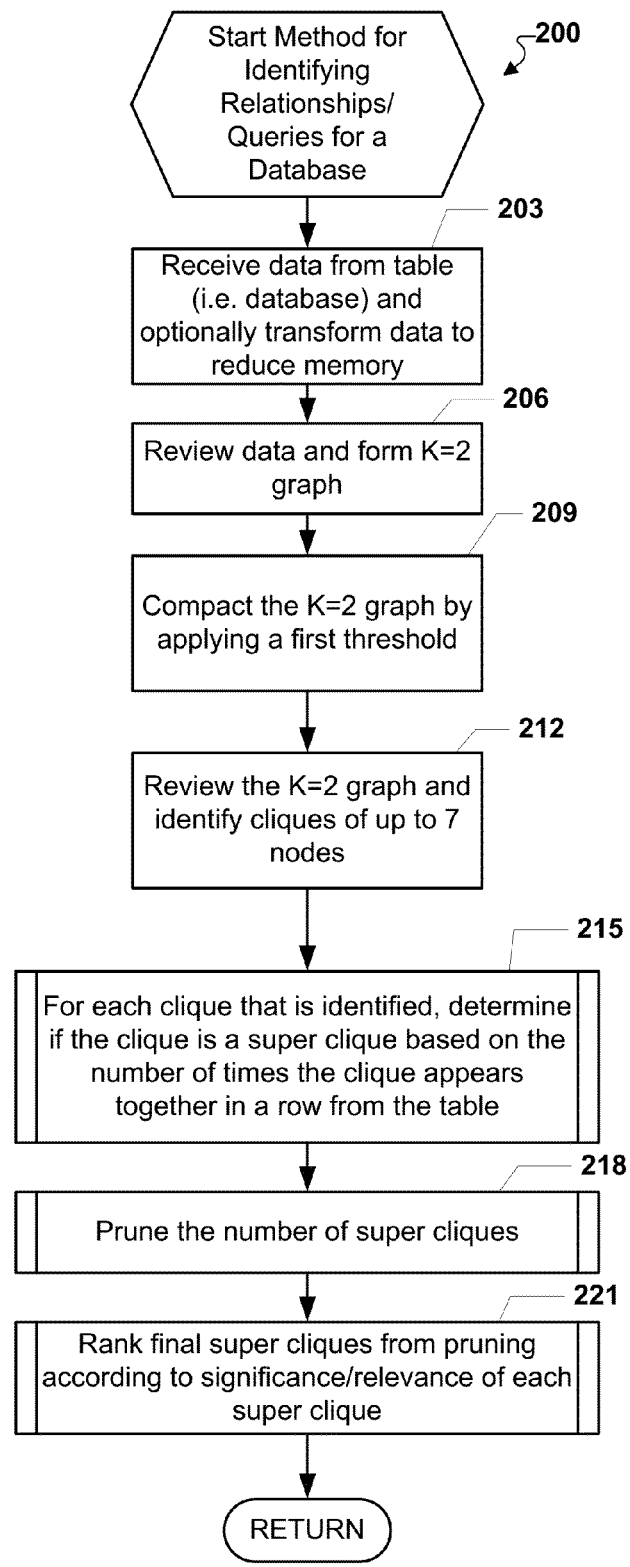
FIG. 2A is a flowchart illustrating a method for generating output of relevant queries for a database.
Figure 2B:
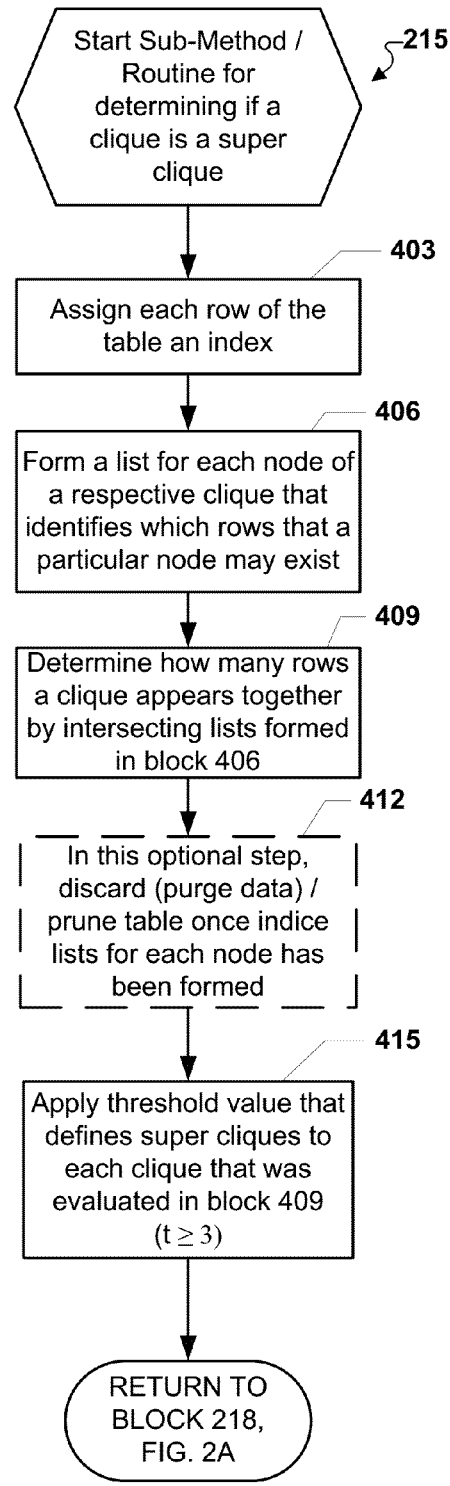
FIG. 2B is a flowchart illustrating a super clique determination sub-method or routine of FIG. 2A which corresponds with the system illustrated in FIG. 1D.

Similarly, the one or more super clique modules 215 correctly correspond with the sub method or routine to 215 illustrated in FIG. 2B. Further details of the one or more super clique modules will be described below in connection with FIG. 2B. The one or more super clique modules 215 are responsible for identifying super cliques as will be described in connection with FIGS. 2A-2B.

The self query modules 200 and the super clique modules 215 of FIG. 1D may generate the K=2 graph 305, and the node occurrence list 1000. Further details of the graph 305 and list 1000 will be described below.

The database server 115 may comprise one or more sequential query language ("SQL") manager modules 109 which may provide access to data tables such as tables 100A, 100B, 100C corresponding to FIGS. 1A-1C described above. The SQL manager modules 109 may receive one or more data requests from the self query modules 200 and super clique modules 215 running on the self query server 102 via the communications network 42.

As described below, the self query modules 200 and the super clique modules 215 of FIG. 1D may be programmed and/or configured differently than illustrated in FIG. 1D as understood by one of ordinary skill the art. That is, it is understood that the self query modules 200 and the super clique modules 215 of FIG. 1D may be separated and executed by one or more different machines/different sub-networks coupled together by a central network like the communications network 42 illustrating FIG. 1D.

FIG. 2A is a flowchart illustrating a method 200 (corresponding to the self query module 200 of FIG. 1D) for generating output the relevant queries for database 115. Block 203 is the first step of the method 200. In block 203, data from the tables 100 may be received by the one or more self query modules 200 over the communications network 42 from the database 115. The received data may also be optionally transformed into a smaller data table by assigning integers for each cell of data within table 100. For example, a person's name such as "John Doe," could be assigned an integer value of ten. So for every instance in table 100 in which the name "John Doe" exists, the computer implementing this invention may substitute that name with the integer value of ten as understood by one of ordinary skill in the art.

Figure 3:
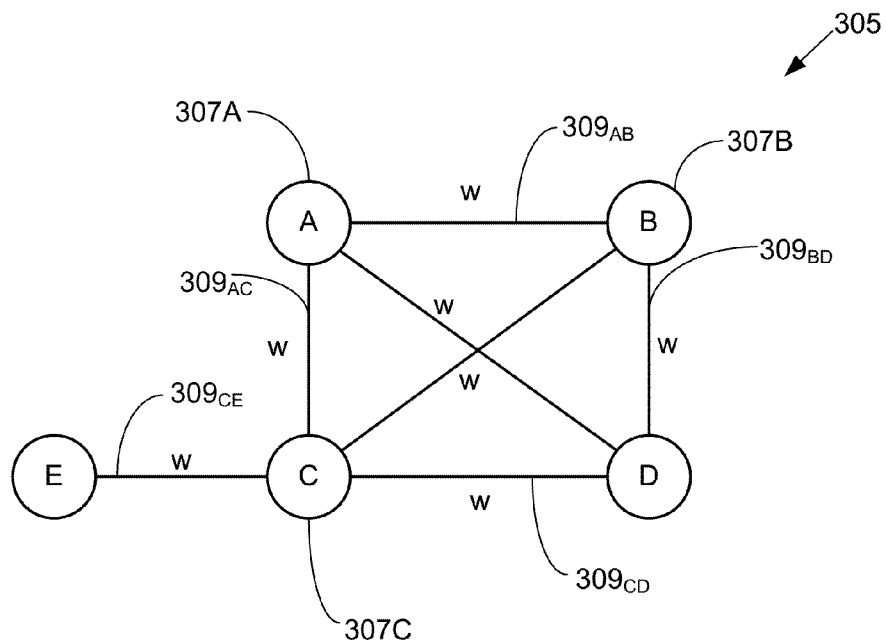
FIG. 3 is a diagram of one exemplary embodiment of a K=2 graph.

In block 206, the database is reviewed by a self query module 200 and the forms a K=2 graph 305 (illustrated in FIG. 3). In this block 206, for each row of the table 100, pairs of data that exist in each row of a database are identified. In other words, referring now to FIG. 3, given a data element "A" and a data element "B" which exist in the table 100 of database 115, the K=2 graph 305 identifies those pairs of data elements which exist in at least one row of data within the database 100. FIG. 3 is a diagram of one exemplary embodiment of a K=2 graph 305.

Each data element in the K=2 graph 305 in FIG. 3 may be characterized as a node or vertex 307 of this K=2 graph 305. Between each node 307, there is a line characterized as an arc, edge, or link having the value of "w", where "w" denotes the number of times, which may also be characterized as weight, that particular nodes 307 appeared together in w rows of the table 100 of the database. For example, for the arc 309$cd$ having a w value=1, this means that the data elements "C" and "D", which may reside in columns of the table 100, appear in one single row of table 100 together.

For this K=2 graph 305 of FIG. 3, every element of a row in table 100 (such as tables 100A, 100B, 100C of FIGS. 1A-1C) is represented by a node 307. So for the exemplary embodiment illustrated in FIG. 3, node 307$c$ is connected to nodes 307$a$, 307$b$, 307$c$, and 307$e$. The arcs 309 between nodes 307$c$ and the other nodes 307 indicate that these elements appear together in at least one row of table 100.

Meanwhile, node 307$e$ is only connected to node 307$c$. This means that node 307$e$ only appears with one other data element in table 100 and that is node 307$c$. Node 307E does not appear anywhere in table 100 with the remaining nodes 307$a$, $b$, or d.

Referring now back to FIG. 2A, in block 209, the K=2 graph 305 is compacted or reduced. The K=2 graph 305 is compacted or reduced by applying a threshold against the w values within the K=2 graph 305. It has been discovered that generally a threshold of t=3 may be applied against the w values such that arcs having w values of two or less may be discarded from the K=2 graph 305.

Figure 4:
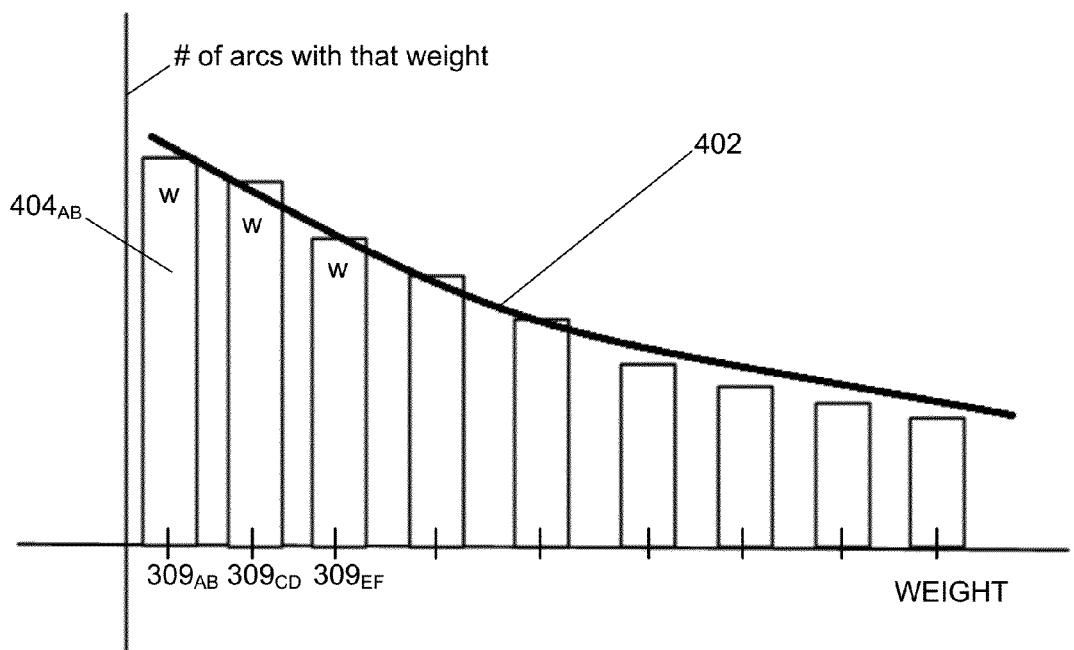
FIG. 4 is a graph illustrating w values from the K=2 graph of FIG. 3 plotted as histograms.

Referring now to FIG. 4, the inventors have discovered that by plotting the w values of FIG. 3 as histograms 404, the curve 402 formed by the histogram usually slopes asymptotically such that the higher histograms of the curve 402 may be characterized as noise or less meaningful data areas. One idea behind compactness is to eliminate arcs within the K=2 graph 305.

Figure 5:
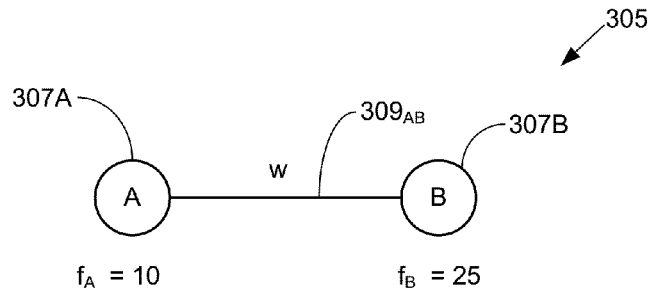
FIG. 5 is a diagram of an exemplary embodiment of a K=2 graph 305 which is compacted.

FIG. 5 helps further demonstrate the idea of compactness. Specifically, FIG. 5 is a diagram of an exemplary embodiment of a K=2 graph 305 and it illustrates what values from nodes 307 may be used to compact this graph 305. Suppose the node 307A of FIG. 5 has a frequency of (a) and node 307B of FIG. 5B has a frequency of (b). Further suppose that the frequency of (a)=10 while (b)=25.

This means that node 307A appears in the table 100 ten times while node 307B appears in table 100 twenty-five times. Given these values, this means that the value for w (which is the number of times that these two nodes 307A, B may appear together) discovered by the following relationship: w≤min [10, 25] which is =10. In other words, the maximum number of times that these two nodes 307A, B may appear together is dictated by the lowest frequency among the two nodes.

Then it follows that a compactness value (compact1) may be assigned as follows:

$$\text{compact1}=(b-a)/b \quad \text{(EQ1)}$$

And it follows that 0≤compact1≤1, where the closer that the compactness value is to one then such a magnitude indicates that node 307A and node 307B are farther apart relative to each other.

Another compactness value (compact2) may be assigned as follows:

$$\text{compact2}=(a-w)/a \quad \text{(EQ2)}$$

And it follows that 0≤compact2≤1, where the closer that the compactness value is to one then such a magnitude indicates w (the number of pairings for node 307A and node 307B) is much less than (a) which is the number of times node 307A appears in the table 100.

Threshold values may be selected for the compactness values (compact1, compact2) in order to remove those arcs or edges 309 between nodes 307 which do not convey or support meaningful relationships between respective nodes 307. For example, an exemplary threshold of 0.90 may be selected for both the "compact1" compactness value and the "compact2" compactness value in order to eliminate less meaningful pairings of nodes 307. For those node pairs having compactness values greater than 0.90, such node pairs are discarded in accordance with equations EQ1 and EQ2 listed above.

Next, in block 212, the compacted K=2 graph 305 is reviewed and cliques having up to a predetermined number, such as seven nodes 307 ("7-cliques") are identified. The predetermined number of cliques can be fewer than or greater than seven as understood by one of ordinary skill in the art.

Usually, lower order nodes such as between three and seven order nodes are identified first. Specifically, cliques are identified in sequence: the third order cliques are identified prior to the fourth-order cliques; the fourth-order of cliques are identified prior to the fifth-order to cliques, etc.

Figure 6:
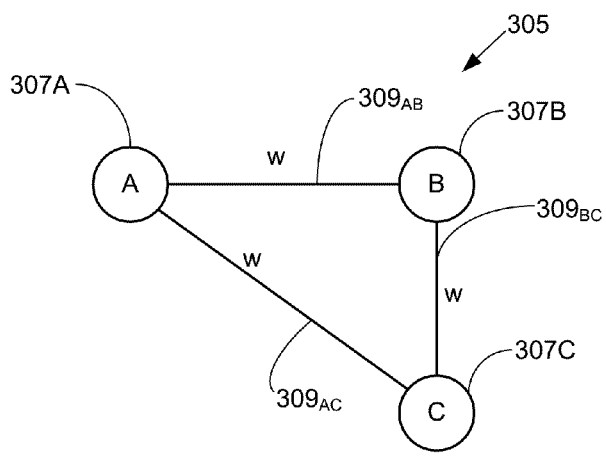
FIG. 6 is a diagram of an exemplary embodiment of a K=2 graph in which a three-clique is identified.
Figure 7:
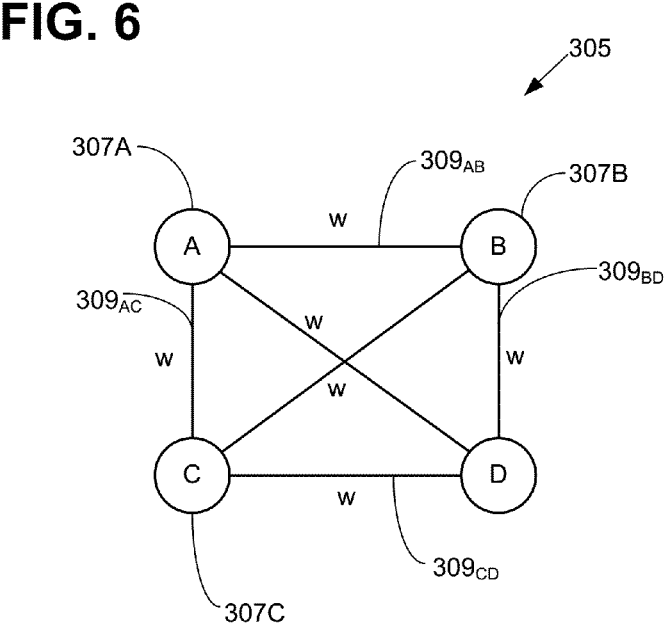
FIG. 7 is a diagram of an exemplary embodiment of a K=2 graph in which a four-clique is identified.
Figure 8:
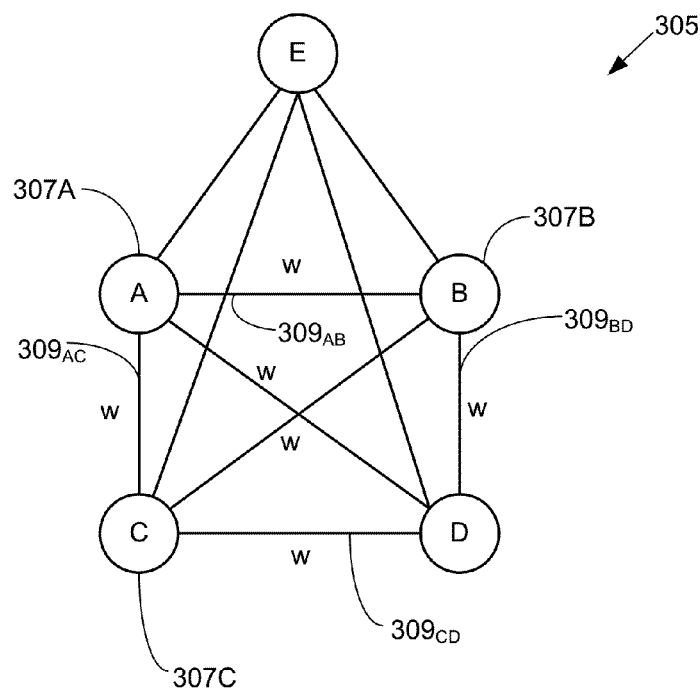
FIG. 8 is a diagram of an exemplary embodiment of a K=2 graph in which a five-clique is identified.

FIG. 6 is a diagram of an exemplary embodiment of a K=2 graph in which a three order clique is identified in block 212 of FIG. 2A. Nodes 307A, 307B and 307C form a "three" clique in FIG. 6 because arcs 309 exist between a respective pair of nodes 307. Referring to FIG. 7, the nodes 307 of this graph 700 may be characterized as a "four" clique because each node 307 is connected to every other node 307 within the group of four nodes 307. This four-order clique may be identified in block 212 of FIG. 2A. Similarly, referring to FIG. 8, the nodes 307 of this graph 700 may be characterized as a "five" clique because each node 307 is connected to every other node 307 within the group of five nodes 307. After block 212 of FIG. 2A in which the three through seven order cliques are identified, for each clique that is identified, it is determined in routine block 215 if each particular clique is a "super" clique based on the number of times a respective clique appears together in a row within the table 100. A clique becomes "super" based on the number of times a respective clique appears together in a row within the table 100.

The answer sought in routine block 215 is just a number: what is the number of times that each clique identified in routine block 215 appears together among the rows of the table 100. As understood by one of ordinary skill in the art, there may be several ways to complete the search outlined in routine block 215. This search outlined in routine block 215 may be characterized as an "exploratory search." And there are several different types of exploratory search techniques as of this writing.

One exemplary technique for completing this exploratory search of block 215 is a conventional sequential query language (SQL) type search. However, there is at least one other faster technique which will be described below in connection with routine 215 illustrated in FIG. 2B.

The number of times that each clique identified in routine block 215 appears together among the rows of the table 100 may be characterized as a super clique threshold. This super clique threshold may be any value which can be selected by an operator of the computer server 102. Generally, the higher the super clique threshold value is, then usually the more meaningful each super clique will likely become with respect to the relationships identified between respective nodes 307 of tables 100.

In routine block 218, the number of super cliques from routine or subroutine 215 may be pruned/reduced according to one or more various submethods as understood by one of ordinary skill in the art. According to one exemplary embodiment, in routine block 218 of FIG. 2A, the pruning process may be performed simultaneously while super cliques greater than seven are being formed in block 221. In other words, pruning may occur while higher order super cliques (those having more than seven nodes 307) are being created in block 221 described below.

Figure 10:
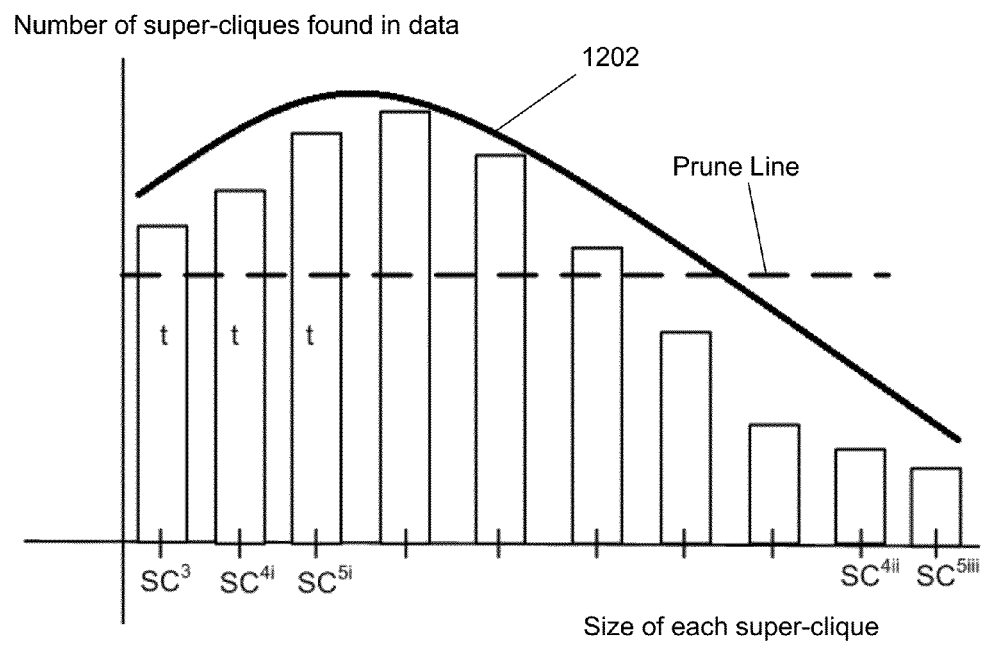
FIG. 10 is a graph illustrating thresholds of super cliques represented as histograms according to one exemplary embodiment.

In another exemplary embodiment, in routine block 218 of FIG. 2A, the pruning/reduction process may be performed after all higher order super cliques (those ≥5) have been created. The inventor has discovered that general trends may be identified when the super cliques are plotted together and lined up as respective histograms. For example, as illustrated in FIG. 10, each super clique may occupy a position on the X-axis of graph 1200. The curve 1202 represents the heights of each histogram 1204 corresponding to each super clique. Specifically, the height of each histogram 1204 corresponds with the threshold value for a particular super clique. The curve 1202 generally has as an increasing slope in the beginning of the histogram plots and then drops off usually very rapidly in an asymptotic manner.

Therefore, the pruning operation in block 218 of method 200 may be performed while higher order super cliques (those ≥7) are being formed or after all these super cliques (those ≥7) have been identified and stored. Usually, super cliques having low thresholds such as those having a threshold value of three or less may be discarded. As noted previously, a threshold value of three means that the super clique appears together in the least three rows of table 100.

The pruning operation of block 218 may further comprise not counting common rows of data among two or more different super cliques. For example, if two super clique's have the same size which means they had the same value for their threshold or if the two super cliques have different sizes meaning that they have different threshold values, it is possible that each of the two super cliques shares one or more identical sets of rows which count toward a respective threshold of a respective super clique. The pruning operation in block 218 may comprise not counting those rows which are common or redundant relative to two or more super cliques more than once.

As a specific example, take a two order super clique which has two nodes 307A and 307B. Meanwhile, a third order super clique may have three nodes such as a first node 307A, a second node 307B, and a third node 307C. The common nodes shared between the second order super clique and the third order super clique, which are nodes 307A and 307B, may share common rows of data relative to the table 100. These redundant common rows of data between the respective super cliques may not be counted meaning that only instance is counted, whereby one super clique out of the two super cliques loses the credit of the redundant row of data towards the threshold value of its respective super clique.

After routine block 218 of FIG. 2A, in block 221, the remaining and final super cliques may be ranked according to their respective significance or relevance. One exemplary technique for ranking the remaining super cliques may comprise the chi-square statistical analysis.

According to the chi-square statistical analysis, significance and/or relevance of data may be measured using the following equation:

$$\frac{(\text{Observed} - \text{Expected})^2}{\text{Expected}} \tag{EQ3}$$

Take for example a three order super clique. The three order super clique has three nodes 307A-C. The Observed value for this three order super clique would be governed by the following equation:

$$\text{Observed} = \frac{(\text{\# of times three nodes 307A-C appear together in rows of table 100})}{N} \tag{EQ4}$$

where variable N in the denominator=the number of rows within table 100.

The numerator for the Observed value has already been computed as described above which was the frequency or threshold value for the three order super clique. The numerator for the observed value is divided by the number of rows in order to achieve a relative frequency which is similar to a probability.

The Expected value for the three order super clique will be governed by the following equation:

$$\text{Expected} = \frac{(\text{Freq. node 307A})}{N} * \frac{(\text{Freq. node 307B})}{N} * \frac{(\text{Freq. node 307C})}{N} \tag{EQ5}$$

where the variable Freq. node 307A=the number of times that node 307A appears within table 100, and similarly, Freq. node 307B=number of times that node 307B appears within table 100, and the same goes for Freq. node 307C. N=the number of rows within table 100. Each of the three frequency values are multiplied together in EQ4 since independence is assumed as understood by one of ordinary skill in the art.

FIG. 2B is a flowchart illustrating a super clique determination sub-method or routine 215 of FIG. 2A which corresponds with the system 101 illustrated in FIG. 1D. This routine or submethod 215 is one faster technique relative to a SQL type search. This submethod 215 assigns each row of the table 100 an index in block 403 which is the first block of the routine or submethod 215 as illustrated in FIG. 2B. Next, in block 406, a list is formed for each node of a respective super clique which identifies in which rows of table 100 that a particular node 307 may exist.

Figure 9:
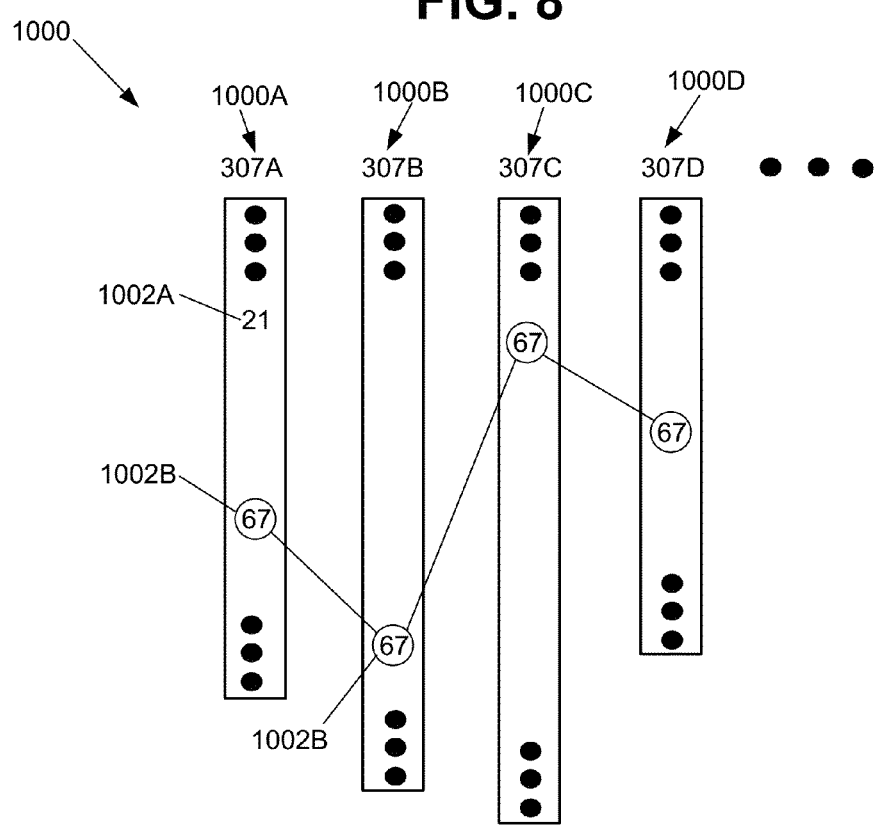
FIG. 9 is a diagram illustrating an exemplary embodiment in which row indices corresponding to one of the tables of FIG. 1A-C is formed.

Referring briefly to FIG. 9, this figure corresponds to block 406 of FIG. 2B. In this figure, row indice lists 1000 have been formed for each node 307 from table 100. List 1000A corresponds to node 307A and this list 1000A includes a plurality of indices 1002 that comprise row numbers corresponding to table 100. So for this exemplary embodiment illustrated in FIG. 9, the node 307A has a first indice 1002A which has a value of 21 to designate that node 307A appears in the twenty-first row of table 100. Similarly, another indice 1002B of the first list 1000A indicates that node 307A appears in the sixty-seventh row of the table 100.

Referring back to FIG. 2B, in block 409, how many rows each clique appears together in is determined by intersecting the lists 1000 which were formed in block 406. In this block 406, a processor may scan each list 1000 in order to identify common order matching indices such as the indice 1002B which has a value of sixty-seven as illustrated in FIG. 9. Since indice 1002B is common to the four lists 1000A-B of FIG. 9, this means that four nodes 307A-D appeared together in at least the sixty-seventh row of table 100. This method 215 may be characterized as a list intersection or index intersection matching technique.

Next, in optional block 412 of FIG. 2B (which has been highlighted with dashed lines), each original table 100 may be discarded/purged from a main memory (and/or stored in another location) once the row indice lists 1000 of FIG. 9 have been formed for each node 307 that has survived the compactness steps described above. This optional block 412 of FIG. 2B may be very important in some situations when table 100 from database 115 is extremely large and can occupy significant amounts of computer readable media.

Next, in block 415, a threshold value that defines a super clique is applied to each clique that was evaluated in block 209. As noted above, the highest order of cliques that have been evaluated up to this stage in the method 200 are only seven order cliques ("7-cliques") which have seven nodes 307 each in a clique.

This threshold value for a super clique usually is any number greater than or equal to three. In other words, a super clique is usually one in which a number of times that a clique appears together in a single row of the table 100 is at least three. So this means if the threshold value is set equal to three, then a three super clique is a clique made of nodes 307 and in which all three nodes 307 appear together in a single row of table 100 at least three times. Similarly, a four super clique is a clique made of nodes 307 and in which all four nodes 307 appear together in a single row of table 100 at least three times. After block 415, the sub-method 215 returns to routine block 218 of FIG. 2A.

As understood by one of ordinary skill the art, forming cliques is usually an iterative process. This means typically one cannot form four order cliques without first informing the three order cliques. However, data can be separated so that the formation of four order cliques could be made in parallel among two or more different data sets containing three order cliques and then later combining the resultant sets as understood by one of ordinary skill in the art. After block 423, the routine or submethod 215 may return back to routine block 218 of method 200 illustrated in FIG. 2A.

Figure 11:
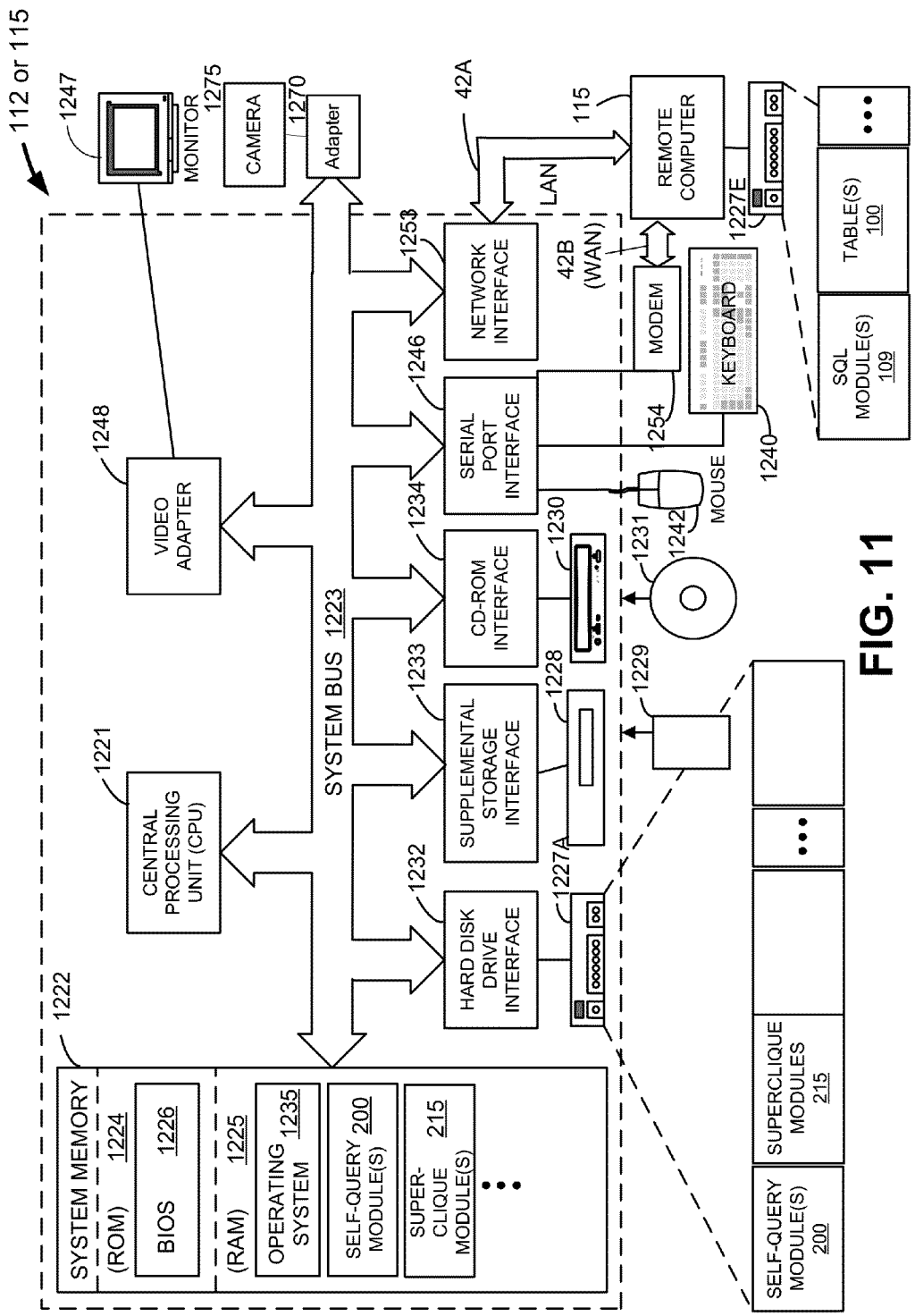
FIG. 11 is a functional block diagram for an exemplary computing device, such as a computer server, that is illustrated in FIG. 1D.

FIG. 11 is a functional block diagram for an exemplary computing device, such as a computer server 112 or 115, that is illustrated in FIG. 1D. This figure is a functional block diagram of another internet connected, for example, a computer 112 or 115, and that can be used in the system 101 for generating an output of relevant queries for the database 115. The exemplary operating environment for the system 101 includes a general-purpose computing device in the form of a conventional computer server 112 or 115.

Generally, a computer 112 or 115 includes a processing unit 1221, a system memory 1222, and a system bus 1223 that couples various system components including the system memory 1222 to the processing unit 1221.

The system bus 1223 may be any of several types of bus structures including a memory bus or memory controller, a peripheral bus, and a local bus using any of a variety of bus architectures. The system memory includes a read-only memory (ROM) 1224 and a random access memory (RAM) 1225. A basic input/output system (BIOS) 1226, containing the basic routines that help to transfer information between elements within computer 1220, such as during start-up, is stored in ROM 1224.

The computer 112 or 115 can include a hard disk drive 1227A for reading from and writing to a hard disk, not shown, a supplemental storage drive for reading from or writing to a removable supplemental storage 1229 (like flash memory and/or a USB drive) and an optical disk drive 1230 for reading from or writing to a removable optical disk 1231 such as a CD-ROM or other optical media. Hard disk drive 1227A, removable supplemental storage drive 129, and optical disk drive 1230 are connected to system bus 1223 by a hard disk drive interface 1232, a supplemental storage drive interface 1233, and an optical disk drive interface 1234, respectively.

Although the exemplary environment described herein employs hard disk 1227A, removable supplemental storage 1229, and removable optical disk 1231, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in internet connected devices such as in cellular phones 2 and/or personal digital assistants (PDAs).

The drives and their associated computer readable media illustrated in FIG. 11 provide nonvolatile storage of computer-executable instructions, data structures, program modules, and other data for computer or client device 115. A number of program modules may be stored on hard disk 1227, magnetic disk 1229, optical disk 1231, ROM 1224, or RAM 1225, including, but not limited to, an operating system 1235 and the self-query module 200 and super clique modules 215. Program modules include routines, sub-routines, programs, objects, components, data structures, etc., which perform particular tasks or implement particular abstract data types. Aspects of the present invention may be implemented in the form of self-query module 200 which is executed by the computers 112, 115 in order to generate an output of relevant queries for the database 100.

A user may enter commands and information into computer 112 or 115 through input devices, such as a keyboard 1240 and a pointing device 1242. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 1221 through a serial port interface 1246 that is coupled to the system bus 1223, but may be connected by other interfaces, such as a parallel port, game port, a universal serial bus (USB), or the like.

The display 1247 may also be connected to system bus 1223 via an interface, such as a video adapter 1248. As noted above, the display 1247 can comprise any type of display devices such as a liquid crystal display (LCD), a plasma display, an organic light-emitting diode (OLED) display, and a cathode ray tube (CRT) display.

The camera 1275 may also be connected to system bus 1223 via an interface, such as an adapter 1270. As noted previously, the camera 1275 can comprise a video camera such as a webcam. The camera 1275 can be a CCD (charge-coupled device) camera or a CMOS (complementary metal-oxide-semiconductor) camera. In addition to the monitor 1247 and camera 1275, the client device 112 or 115, comprising a computer, may include other peripheral output devices (not shown), such as speakers and printers.

The computer 112 or 115 may operate in a networked environment using logical connections to one or more remote computers, such as the server 115 of FIG. 1D. A remote computer may be another personal computer, a server 115, a mobile phone 2, a router, a network PC, a peer device, or other common network node. While the web server 112 or a remote computer server 115 typically includes many or all of the elements described above relative to the client device 112 or 115, only a memory storage device 1227E has been illustrated in the Figure. The logical connections depicted in the Figure include a local area network (LAN) 42A and a wide area network (WAN) 42B. Such networking environments are commonplace in offices, enterprise-wide computer networks, intranets, and the Internet.

When used in a LAN networking environment, the computer 112 or 115 is often connected to the local area network 42A through a network interface or adapter 1253. When used in a WAN networking environment, the computer 112 or 115 typically includes a modem 1254 or other means for establishing communications over WAN 125B, such as the Internet. Modem 1254, which may be internal or external, is connected to system bus 1223 via serial port interface 1246. In a networked environment, program modules depicted relative to the server 115, or portions thereof, may be stored in the remote memory storage device 1227E. It will be appreciated that the network connections shown are exemplary and other means of establishing a communications link between the computers 112 or 115 may be used.

Moreover, those skilled in the art will appreciate that the present invention may be implemented in other computer system configurations, including hand-held devices, multi-processor systems, microprocessor based or programmable consumer electronics, network personal computers, mini-computers, mainframe computers, and the like. The invention may also be practiced in distributed computing environments, where tasks are performed by remote processing devices that are linked through a communications network. In a distributed computing environment, program modules may be located in both local and remote memory storage devices.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the disclosure. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A computer-implemented method for generating output of relevant queries for a database, the method comprising:
   receiving data from a table in a database;
   reviewing the data and forming a K=2 graph;
   compacting the K=2 graph by applying a first threshold;
   identifying one or more cliques of up to seven nodes from the K=2 graph;
   for each clique that is identified, determine if the clique meets a super clique threshold; and
   ranking the one or more super cliques based on relevance.

2. The method of claim 1, further comprising pruning a number of super cliques that were identified.

3. The method of claim 1, wherein determining if a clique meets super clique threshold further comprises assigning each row of the table an index.

4. The method of claim 3, further comprising forming a list of indices for each node of a respective clique that identifies which rows that a particular node may exist in the table.

5. The method of claim 4, further comprising determining how many rows a clique appears together by intersecting lists of indices.

6. The method of claim 5, further comprising purging the table from a main memory the list the of indices based on the table are formed.

7. The method of claim 5, further comprising applying a second threshold value that defines super cliques.

8. A computer-implemented system for generating output of relevant queries for a database, the system comprising:
   means for receiving data from a table in a database;
   means for reviewing the data and forming a K=2 graph;

means for compacting the K=2 graph by applying a first threshold;

means for identifying one or more cliques of up to seven nodes from the K=2 graph;

means for determining if the clique meets a super clique threshold for each clique that is identified; and means for ranking the one or more super cliques based on relevance.

9. The system of claim 8, further comprising means for pruning a number of super cliques that were identified.

10. The system of claim 8, wherein the means for determining if a clique meets super clique threshold further comprises means for assigning each row of the table an index.

11. The system of claim 10, further comprising means for forming a list of indices for each node of a respective clique that identifies which rows that a particular node may exist in the table.

12. The system of claim 11, further comprising means for determining how many rows a clique appears together by intersecting lists of indices.

13. The system of claim 12, further comprising means for purging the table from a main memory the list the of indices based on the table are formed.

14. The system of claim 12, further comprising means for applying a second threshold value that defines super cliques.

15. A computer program product comprising a non-transitory computer usable medium having computer readable program code embodied therein, said computer readable program code adapted to be executed to implement a method for generating output of relevant queries for a database, said method comprising:

receiving data from a table in a database;

reviewing the data and forming a K=2 graph;

compacting the K=2 graph by applying a first threshold;

identifying one or more cliques of up to seven nodes from the K=2 graph;

for each clique that is identified, determine if the clique meets a super clique threshold; and ranking the one or more super cliques based on relevance.

16. The computer program product of claim 15, wherein the program code implementing the method further comprises: pruning a number of super cliques that were identified.

17. The computer program product of claim 15, wherein determining if a clique meets super clique threshold further comprises assigning each row of the table an index.

18. The computer program product of claim 17, wherein the program code implementing the method further comprises: forming a list of indices for each node of a respective clique that identifies which rows that a particular node may exist in the table.

19. The computer program product of claim 18, wherein the program code implementing the method further comprises: determining how many rows a clique appears together by intersecting lists of indices.

* * * * *